United States Patent
Park

(10) Patent No.: US 9,790,034 B2
(45) Date of Patent: Oct. 17, 2017

(54) POWER CHAIN ELONGATION INSPECTING SYSTEM AND METHOD

(71) Applicant: Hyundai Motor Company, Seoul (KR)

(72) Inventor: Sang Kyu Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 436 days.

(21) Appl. No.: 14/569,644

(22) Filed: Dec. 13, 2014

(65) Prior Publication Data

US 2016/0090244 A1 Mar. 31, 2016

(30) Foreign Application Priority Data

Sep. 25, 2014 (KR) .................. 10-2014-0128680

(51) Int. Cl.
*G01B 21/16* (2006.01)
*B65G 43/02* (2006.01)
*G01B 11/04* (2006.01)

(52) U.S. Cl.
CPC .......... *B65G 43/02* (2013.01); *B65G 2207/48* (2013.01); *G01B 11/043* (2013.01); *G01B 21/16* (2013.01)

(58) Field of Classification Search
CPC ......... B61B 10/00; B65G 43/00–43/10; B66B 29/00–29/08; G01B 3/00–3/566; G01L 5/00–5/288
See application file for complete search history.

(56) References Cited

U.S. PATENT DOCUMENTS

| | | | | |
|---|---|---|---|---|
| 3,926,125 A | * | 12/1975 | Orwin | B62D 65/18 104/172.4 |
| 4,372,172 A | * | 2/1983 | Gombocz | G01B 7/042 198/810.04 |
| 5,289,666 A | * | 3/1994 | Hamilton | B65C 9/12 221/236 |
| 5,490,590 A | * | 2/1996 | Courtney | B65G 43/00 198/502.1 |
| 5,563,392 A | * | 10/1996 | Brown | B65G 43/02 235/91 R |
| 6,434,914 B1 | * | 8/2002 | Bouldin | A01G 9/08 221/211 |
| 6,851,546 B2 | * | 2/2005 | Lodge | G01B 7/046 198/502.1 |
| 7,140,486 B2 | | 11/2006 | Kim | |
| 7,793,775 B2 | * | 9/2010 | Rozenfeld | B65H 5/085 198/502.1 |

(Continued)

FOREIGN PATENT DOCUMENTS

JP 2000-291748 A 10/2000
JP 2001-158587 A 6/2001
(Continued)

*Primary Examiner* — Eric Ward
(74) *Attorney, Agent, or Firm* — Mintz Levin Cohn Ferris Glovsky and Popeo, P.C.; Peter F. Corless

(57) ABSTRACT

A power chain elongation inspecting system is provided and includes a power chain that is configured to move in a longitudinal direction and a measuring device that is configured to measure elongation of the power chain. In addition, an electronic tag attaching device is configured to mark failures on the power chain to measure the elongation of the power chain in real time and to track a failure portion of the power chain via a tag attachment.

11 Claims, 4 Drawing Sheets

(56) References Cited

U.S. PATENT DOCUMENTS

| | | | | |
|---|---|---|---|---|
| 8,285,494 B2 * | 10/2012 | Vozner | ............... | G01B 11/028 198/502.1 |
| 2012/0269447 A1 * | 10/2012 | Kouno | ................. | B65G 43/02 382/203 |
| 2015/0013175 A1 * | 1/2015 | Durand | ................. | G01B 11/27 33/286 |
| 2015/0197399 A1 * | 7/2015 | Mayer | .................... | G01N 3/56 73/7 |
| 2016/0348757 A1 * | 12/2016 | Jaeker | ................... | F16G 13/16 |

FOREIGN PATENT DOCUMENTS

| | | |
|---|---|---|
| JP | 2006-250582 A | 9/2006 |
| JP | 2009-156341 A | 7/2009 |
| JP | 5052837 B2 | 10/2012 |
| KR | 20-0317471 Y1 | 6/2003 |
| KR | 10-0559456 B1 | 3/2006 |
| KR | 10-2014-0089966 A | 7/2014 |

\* cited by examiner (a)

(c)

POWER CHAIN ELONGATION INSPECTING SYSTEM AND METHOD

CROSS-REFERENCE TO RELATED APPLICATION(S)

This application is based on and claims the benefit of Korean Patent Application No. 10-2014-0128680, filed on Sep. 25, 2014, the disclosure of which is incorporated herein in its entirety by reference.

TECHNICAL FIELD

The present disclosure relates to a power chain elongation inspecting system, and more particularly, to a power chain elongation inspecting system for inspecting elongation of a power transmission chain that moves a hanger or a truck to prevent damage to the power chain.

BACKGROUND

In general, facilities that move products between processes are used within industrial sites. One representative example of these facilities is a double action type trolley conveyor. The double action type trolley conveyor includes a power rail that has a power chain installed therein that includes a chain dog and a hanger that is disposed below the power rail, is coupled to the chain dog, and moves while being secured by the power chain.

When the double action type trolley conveyor is operated for a substantial period of time or a weight of a product accommodated within the hanger is substantially heavy, the power chain may deform (e.g., become unusable). When the power chain is substantially deformed, operation is stopped and the deformation of the power chain is required to be measured.

An operator manually measures deformation of the power chain or measures deformation of the power chain using a visual examination, an encoder count, or the like. However, when an operator manually measures deformation of the power chain, the operator measures a length change of the power chain with a tape measure, which may cause a periodic stop of production line. In particular, the length change of the power chain may not be measured during an operation of an industrial site in real time and separate tools may be required.

Furthermore, inspection accuracy may be reduced based on lighting within a workplace and a shape of the power chain when using the visual examination method. In addition, the reduced accuracy may cause errors to a measured value. Further, encoder count errors may occur based on a change in frictional force.

According to the conventional method for measuring deformation of a power chain, an entire portion of the power chain may need to be changed due to a substantially deformed portion of the power chain may be impossible to track. In addition, the power chain may be difficult to maintain and repair. In particular, since the conventional method measures elongation on a link basis in a single direction, an excessively deformed portion of the power chain may be difficult to remove.

SUMMARY

An aspect of the present disclosure provides a power chain elongation inspecting system that inspects elongation of a power chain in real time (e.g., while operation of a production line continues) and tracks a failure portion (e.g., deformed portion) of the power chain for maintenance by a change within the failure portion. According to an exemplary embodiment of the present disclosure, a power chain elongation inspecting system may include a power chain configured to move in a longitudinal (e.g., length) direction, a measuring device configured to measure an elongation of the power chain, and an electronic tag attaching device configured to mark failure on the power chain.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present disclosure will be described in detail with reference to the accompanying drawings.

Figure 1:
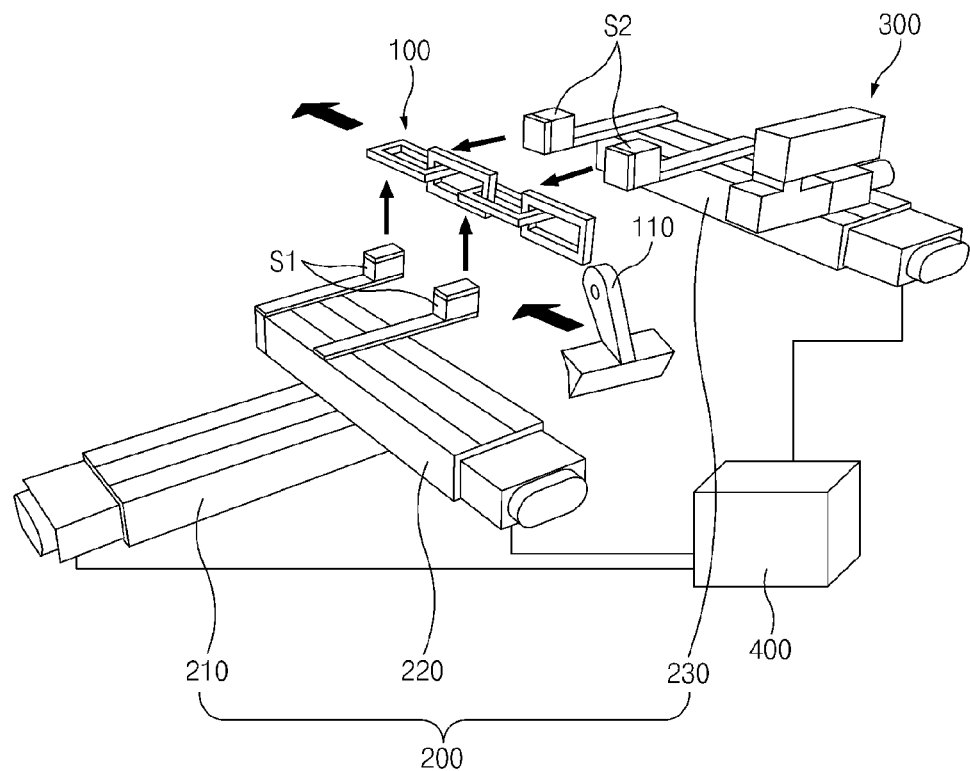
FIG. 1 is an exemplary schematic diagram of a power chain elongation inspecting system according to an exemplary embodiment of the present disclosure.
Figure 2:
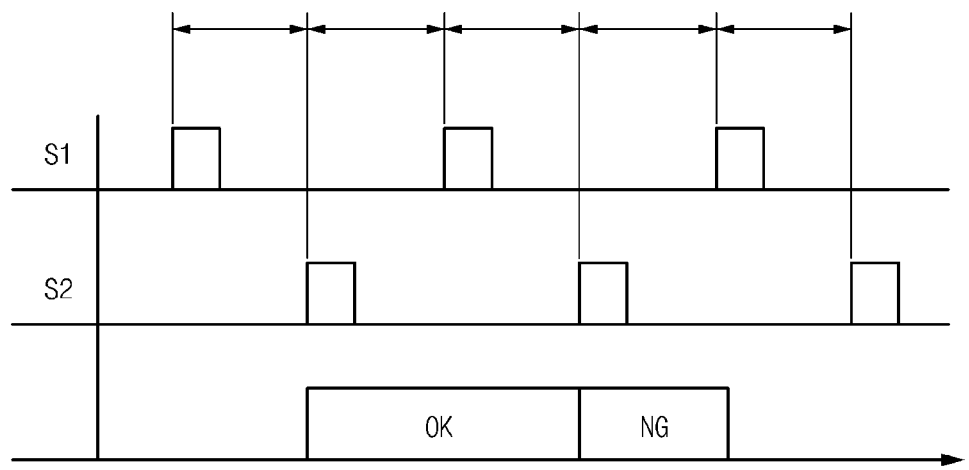
FIG. 2 is an exemplary diagram illustrating an example of measurement of a power chain elongation of the power chain elongation inspecting system of FIG. 1 according to an exemplary embodiment of the present disclosure.
Figure 3:
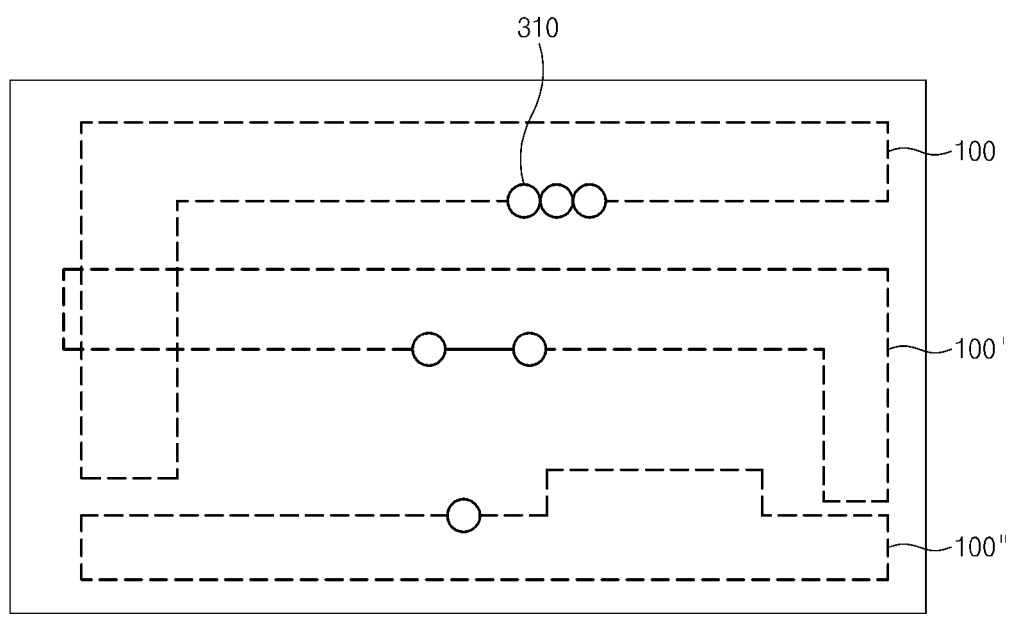
FIG. 3 is an exemplary diagram illustrating distribution of a plurality of power chains included in the power chain elongation inspecting system of FIG. 1 according to an exemplary embodiment of the present disclosure.
Figure 4:
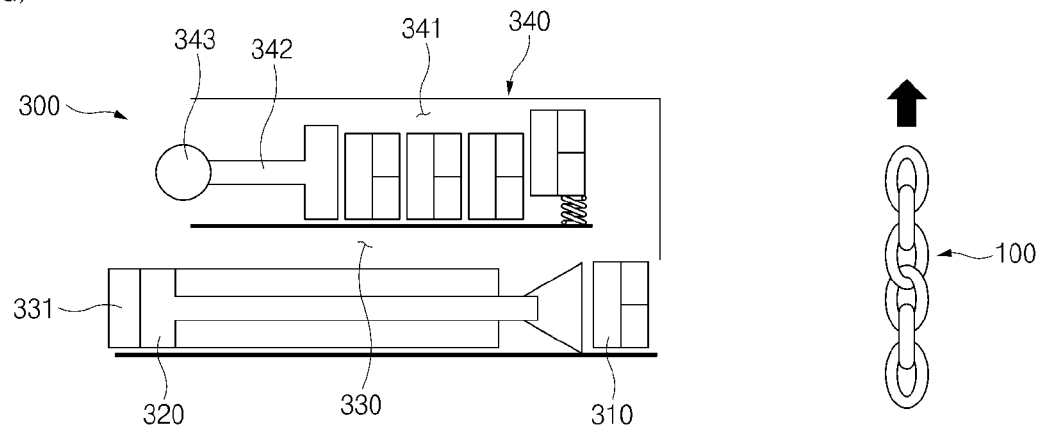
FIG. 4 is an exemplary diagram illustrating an example of an operation of an electronic tag attaching device included in the power chain elongation inspecting system of FIG. 1 according to an exemplary embodiment of the present disclosure.
Figure 4:
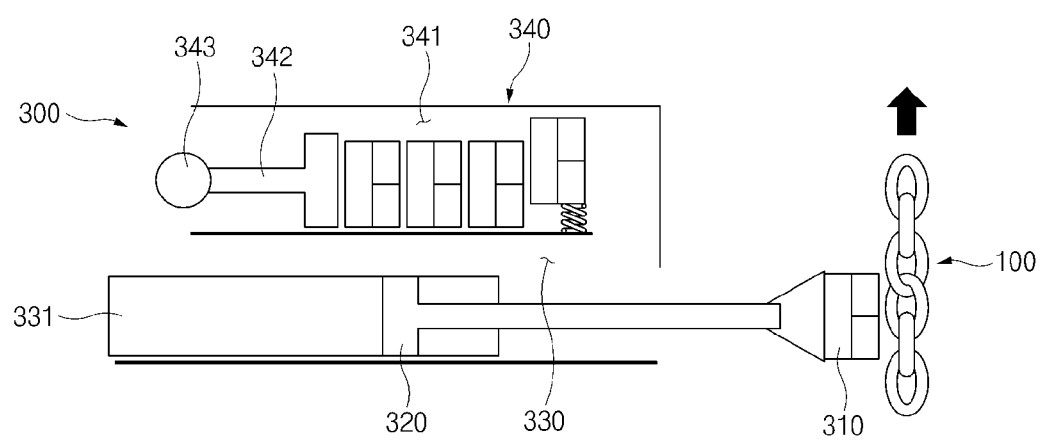
Figure 4:
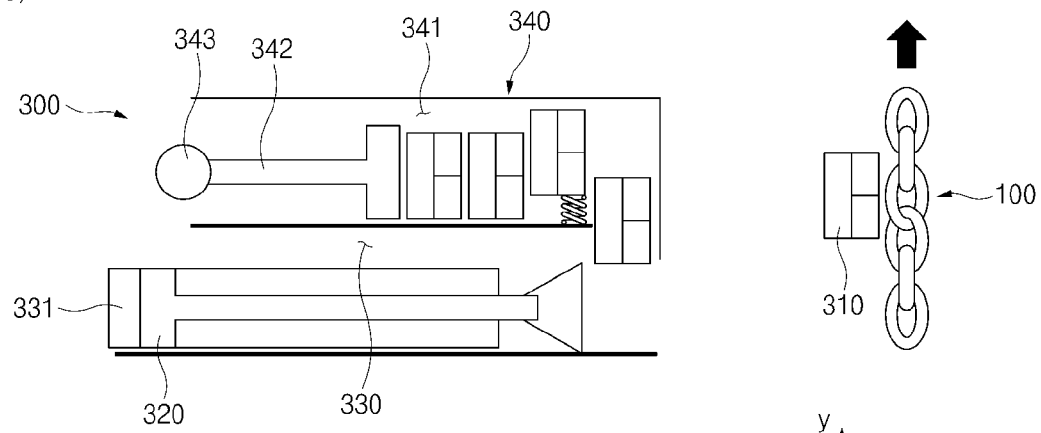
Figure 5:
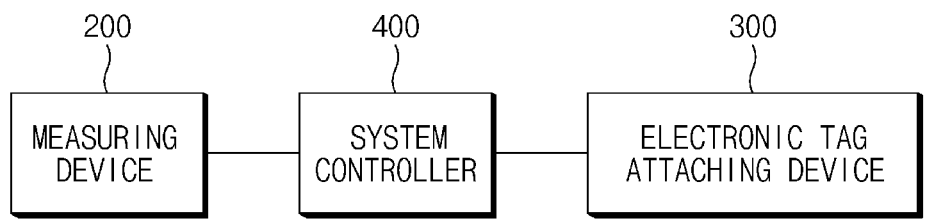
FIG. 5 is an exemplary control block diagram of a system controller included in the power chain elongation inspecting system of FIG. 1 according to an exemplary embodiment of the present disclosure.

As shown in FIGS. 2 to 5, a power chain elongation inspecting system according to an exemplary embodiment of present invention may include a power chain 100 configured to move in a longitudinal (e.g., length, in a direction of an x-axis as shown in FIG. 4) direction, a measuring device 200 configured to measure an elongation of the power chain 100, and an electronic tag attaching device 300 configured to mark failure (e.g., substantial elongations) on the power chain 100. The power chain 100 may include a chain dog 110 that protrudes downward and may include a hanger dog coupled to the chain dog 110 and a hanger trolley secured by the power chain 100 via the hanger dog. A horizontal direction detection sensor S2 and a vertical direction detection sensor S1 may be configured to measure a longitudinal direction deformation of the power chain 100.

The measuring device 200 may include a third linear actuator 230 configured to move the horizontal direction detection sensor S2 disposed next to the power chain 100 in a longitudinal (e.g., length, in a x-axis direction as shown in FIG. 4) direction of the power chain 100, a second linear actuator 220 configured to move the vertical direction detection sensor S1, disposed below (e.g., on a bottom side of) the power chain 100, in the longitudinal direction of the power chain 100, and a first linear actuator 210 configured to move the second linear actuator 220 in a latitudinal (e.g., width, in a y-axis direction as shown in FIG. 4) direction of the power chain 100.

According to an exemplary embodiment of the present disclosure, the power chain elongation inspecting system may include four photo sensors, but is not limited thereto. In other words, two horizontal direction detection sensors S2 and two vertical direction detection sensors S1 may be disposed as a detection sensor. The detection sensor, may also be a hall sensor or the like and may not be limited a photo sensor. A distance between the two vertical direction detection sensors S1 may be adjusted using the second linear actuator 220 and a distance between the two horizontal direction detection sensors S2 may be adjusted using the third linear actuator 230 to set a target measurement reference distance.

In particular, when the distance between the two vertical direction detection sensors S1 and the distance between the two horizontal direction detection sensors S2 decrease, a length change in a bottom surface of the power chain 100 may be more precisely measured. Since a plurality of links that constitute the power chain 100 may be formed with about the same length, and thus length changes in links may be more precisely measured as the measurement reference distance is reduced (refer to FIG. 2). In addition, as the measurement reference distance increases, the length changes in the plurality of links may be measured as a whole (e.g., all together).

The vertical direction detection sensors S1 may be moved in the latitudinal (e.g., width) direction and longitudinal (e.g., length) direction of the power chain 100 by the second linear actuator 220 and the first linear actuator 210, respectively. Accordingly, the vertical direction detection sensor S1 may be configured to measure the length change in the bottom surface of the power chain 100 without interference from the chain dog 110.

According to an exemplary embodiment of the present disclosure, three power chains 100 may be installed and each of the three power chains 100 may include a measuring device 200 and an electronic tag attaching device 300. The electronic tag attaching device 300 may be installed within the third linear actuator 230. In addition, the electronic tag attaching device 300 may include an electronic tag 310 attached to the power chain 100 and a moving arm 320 configured to move the electronic tag 310 toward the power chain 100. The electronic tag 310 may include a magnet and may be attached to a link formed of iron using the magnet.

The electronic tag attaching device 300 may include a housing 340 configured to receive the moving arm 320 and a plurality of electronic tags 310. The housing 340 may include a magazine 341 into which the plurality of electronic tags 310 may be inserted, a motor 343 and a pressurizing arm 342 disposed within the magazine 341 and configured to move in a longitudinal (e.g., length) direction of the magazine 341 and guide (e.g., move) the electronic tag 310 toward an exit disposed at one side of the magazine 341, and a moving arm installation portion 330 disposed at one side of the magazine 341 and accommodates the moving arm 320 therein. A pneumatic cylinder 331 may be configured to operate the moving arm 320.

According to the present disclosure, the power chain elongation inspecting system may further include a system controller 400 configured to execute the operations of the measuring device 200 and the electronic tag attaching device 300. The system controller 400 may be configured to calculate a measured distance and elongation based on the value measured by the horizontal direction detection sensor S2 and the vertical direction detection sensor S1 and compare the measured distance and the elongation with reference values (refer to FIG. 5). The measured distance and the elongation may be represented by Equations 1 and 2 below.

$$\text{Measured distance} = \frac{\text{Time difference}}{\text{Velocity}} \qquad \text{Equation 1}$$

In particular, the time difference may be a time taken to move the horizontal direction detection sensor S2 disposed in front (e.g. forward) of another horizontal direction detection sensor a measurement reference distance, and then to move the horizontal direction detection sensor S2 disposed behind (e.g., in back of) another horizontal direction detection sensor. The velocity may be a moving velocity of the power chain 100.

$$\text{Elongation} = \frac{\text{Measured distance}}{\text{Reference distance}} \qquad \text{Equation 2}$$

In particular, the measured distance may be calculated using Equation 1 above and the reference distance may be a measurement reference distance.

When the measured distance and the elongation do not satisfy (e.g., are greater than) reference values, the system controller 400 may be configured to operate the electronic tag attaching device 300 to attach a tag on a link of the power chain 100 within the measurement reference distance (refer to FIG. 4.). The power chain elongation inspecting system according to the present disclosure may be configured to measure elongation of a power chain in real time (e.g., while operation of the production line continues) and track a failure portion of the power chain via a tag attachment. The power chain may be more easily managed and repaired via tracking and monitoring of defective chains. The power chain may be measured on a product basis or link basis. In addition, there errors due to lighting, a shape of the power chain, and friction force may be prevented.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed:

1. A power chain elongation inspecting system, comprising:
   a power chain configured to be moved in a longitudinal direction; and
   a controller having a processor and a memory configured to:
      measure an elongation of the power chain using a measuring device; and
      mark failures on the power chain using an electronic tag attaching device,
   wherein the measuring device includes:
      a horizontal direction detection sensor disposed adjacent to the power chain and configured to measure the elongation of the power chain;
      a vertical direction detection sensor disposed below the power chain;
      a second linear actuator configured to move the vertical direction detection sensor in the longitudinal direction of the power chain;
      a third linear actuator configured to move the horizontal direction detection sensor in the longitudinal direction of the power chain,
      wherein the electronic tag attaching device is disposed within the third linear actuator.

2. The power chain elongation inspecting system according to claim 1, wherein the power chain includes a chain dog that protrudes downward.

3. The power chain elongation inspecting system according to claim 2, wherein the power chain further includes:
   a hanger dog coupled to the chain dog; and
   a hanger trolley secured by the power chain via the hanger dog.

4. The power chain elongation inspecting system according to claim 1,
   wherein the controller is further configured to operate the third linear actuator and the second linear actuator.

5. The power chain elongation inspecting system according to claim 4, wherein the second linear actuator includes:
   a first linear actuator,
   wherein the controller is further configured to move the second linear actuator in a latitudinal direction of the power chain.

6. The power chain elongation inspecting system according to claim 1, wherein the electronic tag attaching device includes:
   an electronic tag configured to be attached to the power chain,
   wherein the controller is further configured to move the electronic tag toward the power chain, using a moving arm.

7. The power chain elongation inspecting system according to claim 6, wherein the electronic tag attaching device further includes a housing into which the moving arm and a plurality of electronic tags are inserted.

8. The power chain elongation inspecting system according to claim 7, wherein the housing includes:
   a magazine configured to receive the plurality of electronic tags;
   a motor and a pressuring arm disposed within the magazine and configured to move in a longitudinal direction of the magazine and guide the electronic tags toward an exit formed at one side of the magazine; and
   a moving arm installation portion disposed at one side of the magazine and configured to house the moving arm therein.

9. The power chain elongation inspecting system according to claim 8, wherein the moving arm installation portion includes a pneumatic cylinder configured to operate the moving arm.

10. The power chain elongation inspecting system according to claim 1, wherein the elongation of the power chain is calculated based on a value measured by the horizontal direction detection sensor and the vertical direction detection sensor.

11. The power chain elongation inspecting system according to claim 10, wherein an electronic tag attaching device is configured to attach an electronic tag to the power chain when the elongation is greater than a reference value.

* * * * *